Dec. 9, 1941.  G. T. KOPP  2,265,648
ELECTROMAGNETIC VALVE
Filed April 19, 1940  2 Sheets-Sheet 1
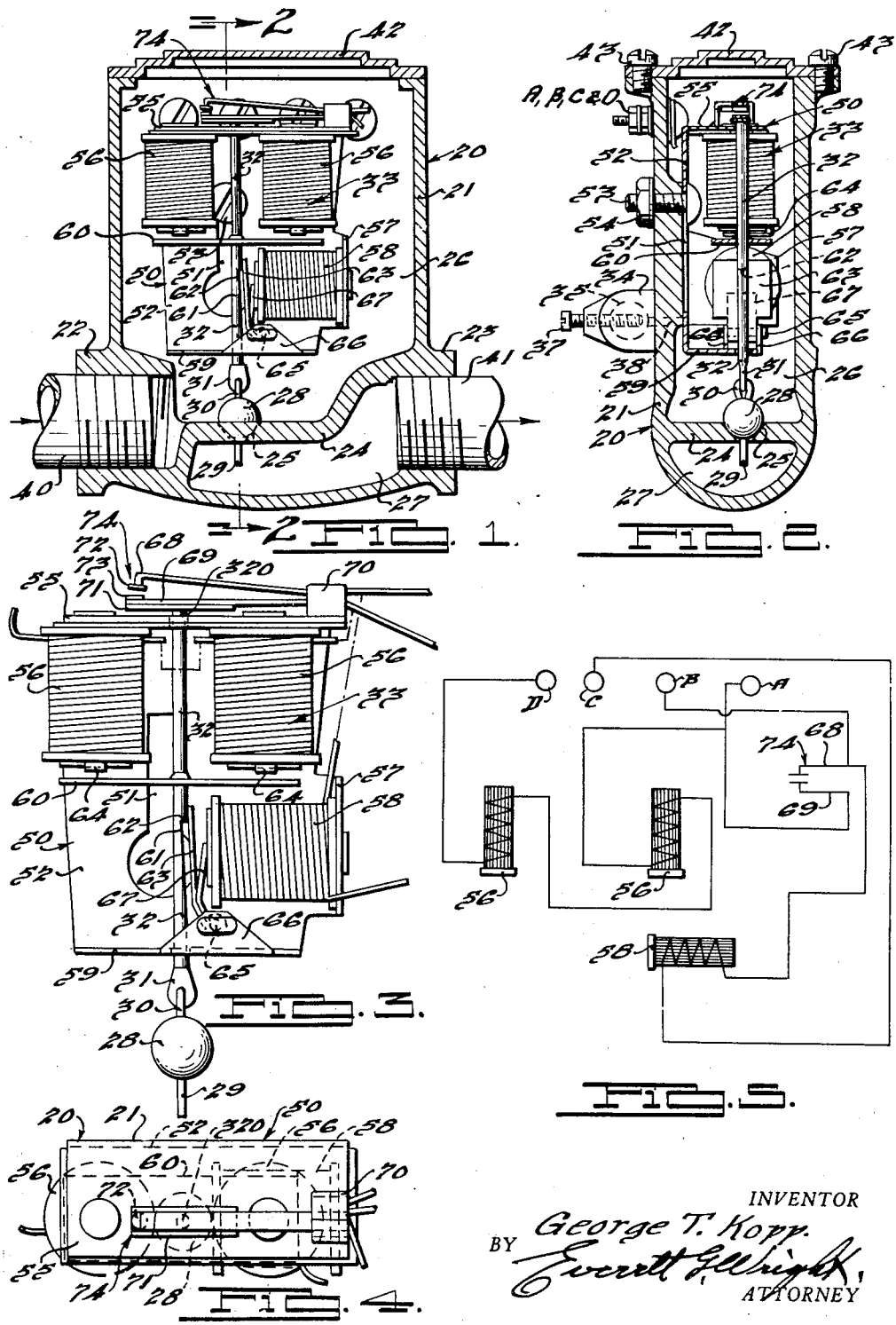
INVENTOR
George T. Kopp.
BY Everett G. Wright,
ATTORNEY Dec. 9, 1941.  G. T. KOPP  2,265,648
ELECTROMAGNETIC VALVE
Filed April 19, 1940  2 Sheets-Sheet 2
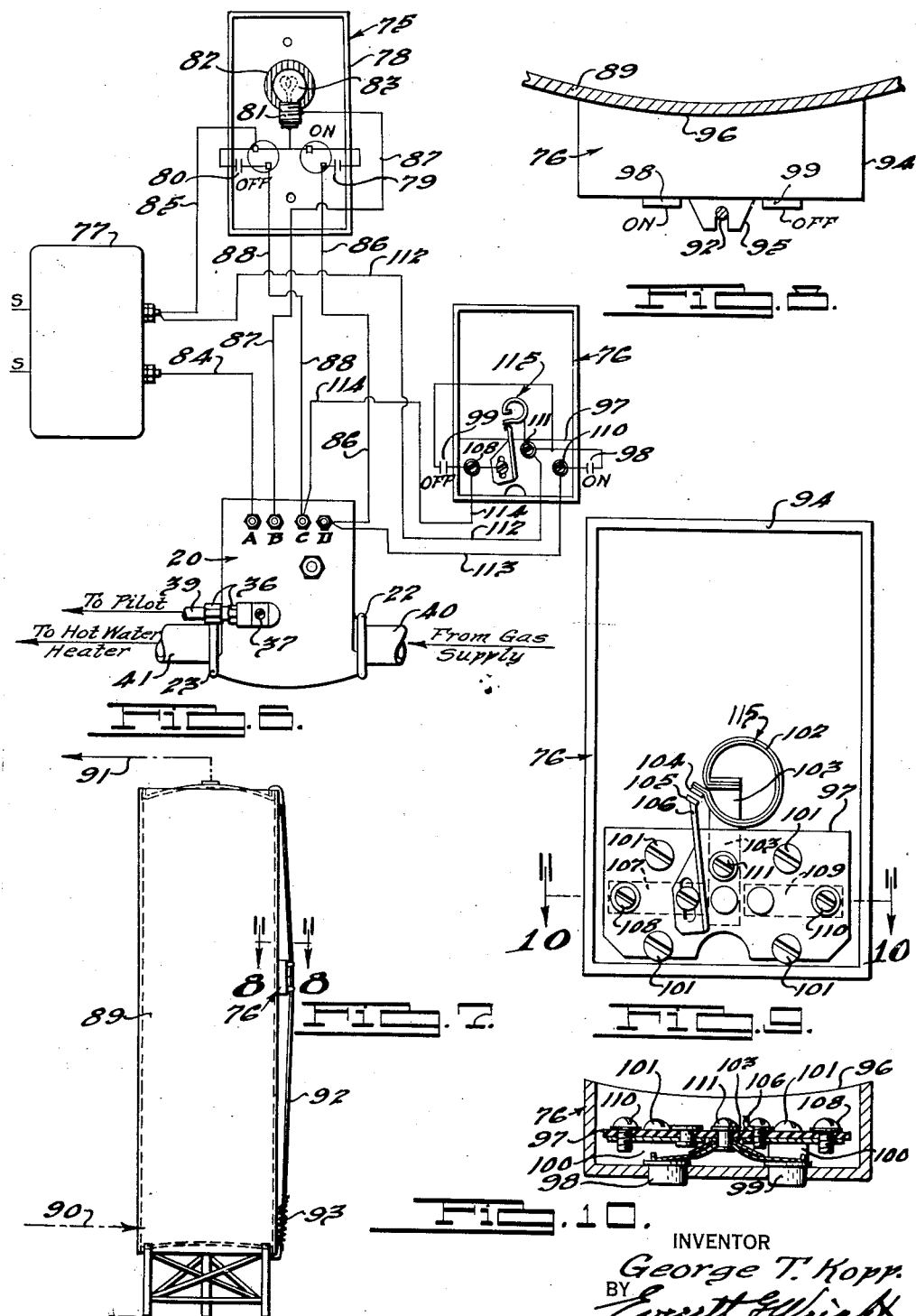
INVENTOR
George T. Kopp.
BY Everett G. Wright
ATTORNEY Patented Dec. 9, 1941

2,265,648

UNITED STATES PATENT OFFICE 2,265,648

ELECTROMAGNETIC VALVE

George T. Kopp, Detroit, Mich.

Application April 19, 1940, Serial No. 330,632

3 Claims. (Cl. 137—139)

This invention relates to combined manual and thermostatic control for hot water heaters including electro-magnetic valve means therefor.

One object of the invention is to provide a combined manual and thermostatic control for hot water heaters including electro-magnetic valve means therefor wherein the said electro-magnetic valve means is energized only while the valve is being opened and closed and not while water is being heated.

Another object of the invention is to provide simple, inexpensive electro-magnetic valve means adapted to be opened responsive to an electric impulse, mechanically maintained in an open position, and mechanically closed responsive to a second electric impulse.

Another object of the invention is to provide simple, inexpensive combined electro-magnetic valve and switch in which the valve is opened and switch closed responsive to an electric impulse, in which the valve is maintained open and the switch maintained closed mechanically, and in which the valve is closed and switch is opened mechanically responsive to a second electric impulse.

Other objects of the invention will become apparent by reference to the following detailed description taken in connection with the accompanying drawings, in which:

Fig. 1 is a longitudinal sectional view of a valve and switch mechanism embodying the invention.

Fig. 2 is a transverse sectional view taken on the line 2—2 of Fig. 1.

Fig. 3 is an enlarged side elevational view of the combined electro-magnetic and mechanical valve and switch mechanism employed.

Fig. 4 is a plan view of the construction shown in Fig. 3.

Fig. 5 is a wiring diagram of the electrical connections to the electro-magnetic and switch means disclosed in Figs. 1 to 4 inclusive.

Fig. 6 is a wiring diagram showing a manual and thermostatic control for hot water heaters embodying the invention employing the combined electro-magnetic and mechanical valve and switch mechanism disclosed in Figs. 1 to 5 inclusive.

Fig. 7 is a more or less diagrammatic elevational view disclosing a preferred means for adjustably securing a combined thermostatic and manual switch element to a hot water tank.

Fig. 8 is an enlarged fragmentary horizontal sectional view taken on the line 8—8 of Fig. 7.

Fig. 9 is a rear elevational view of a combined manual and thermostatic switch element preferably employed in the combination manual and thermostatic control for hot water heaters disclosed herein.

Fig. 10 is a horizontal sectional view taken on the line 10—10 of Fig. 9 looking in the direction indicated by the arrows and turned 180 degrees with respect to Fig. 9.

Referring now to the drawings wherein like numerals refer to like and corresponding parts throughout the several views, the novel electro-magnetic valve and switch means disclosed in Figs. 1 to 5 inclusive will first be described in detail, and then a detailed description of the combined manual and thermostatic control for hot water heaters disclosed in Figs. 6 to 10 inclusive will be given.

In Figs. 1 and 2, the gas valve 20 comprises a housing 21 having a threaded gas inlet 22 and a threaded gas outlet 23 at the bottom of opposite ends thereof and a generally horizontally disposed baffle 24 separating the interior of the said housing 21 into an upper inlet chamber 26 and a lower outlet chamber 27. The said baffle 24 has an inverted frusto-conical gas port 25 therethrough against the upper sloping periphery of which a ball valve member 28 seats by gravity. The said ball valve member 28 has a guide pin 29 depending therefrom which maintains the said ball valve member 28 in alignment over the port 25 when the valve is open even though the valve housing 21 may be mounted considerable off from its preferred vertical position. The upper end of the said ball valve member 28 is preferably provided with an eye 30 which is linked into an eye 31 formed on the depending end of the reciprocating vertically disposed valve operating plunger 32 of the electro-magnetic valve and switch unit 33.

The housing 21 has a protuberance 34 formed on one side thereof which is hollow bored and threaded from one end at 35 to receive a pilot light tube connection fitting 36 and is cross bored and threaded to accommodate a pilot light adjusting screw 37. The said pilot light adjusting screw 37 is formed conical at its inner end to seat around the periphery of the by-pass pilot light bleeder bore 38 communicating between the hollow bore 35 and the gas inlet chamber 26. A flexible tube 39 runs from the pilot light tube connection fitting 36 to the pilot light of a gas heater supplied with gas through the gas valve 20. Gas is piped to the gas inlet 22 and from the gas outlet 23 of the gas valve 20 by means of inlet and outlet piping 40 and 41 respectively.

After the valve 28 and electro-magnetic valve and switch unit 33 are assembled and wired within the housing 21 to suitable terminals A, B, C, and D which extend in hermetically sealed and insulated relationship through the housing 21, a cover member 42 is secured in hermetically sealed relationship over the top of the upper inlet chamber 26 by means of suitable machine screws 43 as indicated in Fig. 2.

The said electro-magnetic valve and switch unit 33 comprises a bracket 50 having a slot 51 in the back 52 thereof through which the shank of a securing bolt 53 extends. The said securing bolt 53 is positioned in hermetically sealed relationship through the housing 21 and is tightened by a nut 54 in such a manner that the head of the said securing bolt 53 engages the back 52 of the bracket 50 and holds the said electro-magnetic valve and switch unit in its proper adjusted position wherein the ball valve member 28 depending from the valve operating plunger 32 seats in the valve seat formed by the inverted frusto-conical gas port 25 when the valve operating plunger 32 is in its normal or "off" position.

The bracket 50 of the said electro-magnetic valve and switch unit 33 has an upper horizontally disposed magnet and switch support 55 under which a pair of laterally spaced electro-magnets 56 are secured in depending relationship. The said bracket 50 has a lug 57 extending outward therefrom at one side thereof onto which a single horizontally disposed electro-magnet 58 is secured. The said electro-magnet 58 is disposed normal to and in spaced relationship below one of the said electro-magnets 56, see Figs. 1, 2 and 3.

The said bracket 50 has a lower horizontally disposed plunger guide 59 through which the lower portion of the valve operating plunger 32 slides freely. The upper end of the said valve operating plunger 32 slides freely through the upper electro-magnet and switch support 55 midway between the pair of electro-magnets 56 to operate the switch 74 as hereinafter described in detail. It will be noted by reference to Fig. 2 that the axial centers of the pair of vertically disposed electro-magnets 56, the axial center of the horizontally disposed electro-magnet 58, the axial center of the valve operating plunger 32, and the axial center of the ball valve member 28 are all in a single plane.

The valve operating plunger 32 is preferably formed of a non-magnetic material and has a transversely disposed armature 60 of magnetic material fixed thereto located to clear the lower ends of the vertically disposed electro-magnets 56 when the said valve operating plunger 32 is in its normal or "off" position. The valve operating plunger 32 is notched at 61 to provide a horizontally disposed shoulder 62 under which the upper end of a vertically disposed spring loaded detent 63 located opposite the end of the horizontally disposed magnet 58 becomes positioned when the valve operatng plunger 32 is lifted to its up or "on" position when the electro-magnets 56 are energized. A light horizontally disposed U-spring of a non-magnetic material such as phosphor-bronze or brass is secured to the lower end of each vertically disposed magnet 56 and serves to break the armature 60 from the said magnets 56 when current therethrough is cut off, thus assuring the gravity dropping of the valve operating plunger 32 and the closing of the gas port 25 by the ball valve member 28 upon release of the valve operating plunger 32 from its detent 63.

The said detent 63 is of magnetic material and is pivotally mounted around a horizontally disposed cotter pin 65 extending between a pair of apertured tabs 66 struck up from the lower horizontally disposed plunger guide 59 as indicated in Figs. 1, 2 and 3. A cantilever spring 67 of non-magnetic material is preferably anchored at the cotter pin 65, is positioned between the detent 63 and the outer end of the core of the horizontally disposed electro-magnet 58, and is formed in such a manner as to react against the said outer end of the core of the said electro-magnet 58 and constantly urge the said detent 63 against the notched and shouldered valve operating plunger 32 as best shown in Fig. 3. The detent 63, being of magnetic material, is caused to pivot about the cotter pin 65 and release the valve operating plunger 32 when the horizontally disposed detent release electro-magnet 58 is energized.

The ball valve member 28 and the valve operating plunger 32 are maintained normally in their "off" position as indicated in Figs. 1 and 2 by gravity. When the pair of electro-magnets 56 are energized momentarily, the said magnets attract the armature 60 fixed to the valve operating plunger 32 which lifts the said valve operating plunger 32 to its "on" position and opens gas port 25 by lifting the ball valve member 28 therefrom. When the valve operating plunger 32 rises, the spring loaded detent armature 63 snaps against the notch 61 of the said plunger 32 below the shoulder 62 thereof and prevents the said valve operating plunger 32 and the ball valve member 28 carried thereby from gravitating from its "on" to its "off" position. However, after the operating plunger 32 and the ball valve member 28 are in their "on" position, and when the horizontally disposed release electro-magnet 58 is energized, the detent armature 63 pivots against the end of the core of the said electro-magnet 58 and releases the valve operating plunger 32 whereby to permit the said valve operating plunger 32 and ball valve member 28 to again drop by gravity to their "off" position.

A pair of flexible switch arms 68 and 69 of resilient non-magnetic material are mounted in a suitable support 70 one above the other in insulated relationship with respect to each other, the outer portion of the lower switch arm 69 having a fiber insulating pad 71 thereunder against which the upper end 320 of the valve operating plunger 32 acts when the electro-magnets 56 are energized and the valve ball valve member 28 and the valve operating plunger 32 are lifted to their "off" position. The raising of the said valve operating plunger 32 to its "off" position closes contacts 72 and 73 on the said flexible switch arms 68 and 69 respectively. Thus, the electro-magnetic valve and switch unit 33 opens the gas port 25 by raising the ball valve member 28 responsive to an electric impulse simultaneously with closing the switch 74 composed of the flexible switch arms 68 and 69 and contacts 72 and 73 respectively thereon, and the said gas port 25 is maintained open and the said switch 74 is maintained closed mechanically until a second electric impulse releases the ball valve member 28 to close the gas port 25 which simultaneously permits the said switch 74 to open.

Fig. 5 shows a wiring diagram of the electrical connections from and between the electromagnets 56 and 58 and the electric switch 74 to the terminals A, B, C, and D extending in insulated relationship through the housing 21 of the gas valve 20.

Following is a detailed description of the combined manual and thermostatic control for hot water heaters disclosed in Figs. 6 to 10 inclusive which employs the gas valve 20 hereinbefore described, a remote combined manual "on" and "off" operating switch and pilot light unit 75, a combined manual "on" and "off" and thermostatic "off" switch 76 and a transformer 77.

The said combined "on" and "off" switch and pilot light unit 75 is shown more or less diagrammatically in Fig. 6 and comprises a wall plate 78 having spring loaded normally open "on" and "off" switches 79 and 80 respectively and a signal light receptacle 81 mounted on the reverse side thereof. A red lens 82 fixed in the wall plate 78 opposite a signal light bulb 83 screwed in the receptacle 81 serves to provide a red signal light at the wall plate 78 when the gas valve 20 is open and the switch 74 thereof is closed by the raising of the valve operating plunger 32 as hereinbefore described. It will be noted that one side of the normally open "on" switch 79 is permanently connected to one side of the normally open "off" switch 80 and that one side of the signal light receptacle is connected to the said permanent connection between the said "on" and "off" switches.

By reference to Figs. 1, 3, 5 and 6, it will be observed that the momentary pressing of the "on" switch 79 of the "on" and "off" switch and pilot light unit 75 causes an electric impulse from the transformer 77 connected to a source S—S of electric current to pass through conductors 84, 85 and 86 to terminals A and D of the gas valve 20 whereupon the electro-magnets 56 thereof are energized which opens the gas port 25 and closes the electric switch 74 as hereinbefore described in detail. The closing of the electric switch 74 of the gas valve 20 carries current to the terminal B thereof which lights the signal light bulb 83 through conductors 85 and 87. The signal light 83 remains lighted the entire time the gas port 25 of the gas valve 20 remains opened.

By the momentary pressing of the "off" switch 80 of the "on" and "off" switch and pilot light unit 75, an electric impulse from the transformer 77 passes through conductors 84, 85 and 88 to the terminals A and C of the gas valve 20 whereupon the electro-magnet 58 thereof is energized, the gas port 25 is closed and the electric switch 74 is opened, all as hereinbefore described in detail. The opening of the electric switch 74 shuts off current to the signal light bulb 83, which, when dark, shows that gas is not passing through the gas valve 20 to the gas water heater to which a gas line therefrom is connected and that water is not being heated.

The gas heater which is supplied with gas from the gas valve 20 is not shown, however, water is piped through the gas heater in the usual and customary manner to a hot water storage tank 89 which preferably has its water inlet 90 at or near the bottom thereof and has its water outlet 91 at the top thereof as indicated by the dot and dash lines 90 and 91 in Fig. 7.

The combined manual "on" and "off" and thermostatic "off" switch 76 is slidably secured to the face of the hot water storage tank 89 by means of a wire cable 92 hooked to the top and bottom of the said storage tank 89 and maintained taut by a tension spring 93. The housing 94 of the said combined manual "on" and "off" and thermostatic "off" switch 76 has a pair of notched guides or lugs 95 on the face thereof to receive the taut cable 92 and is curved at 96 to conform to the hot water storage tank 89.

The said combined manual "on" and "off" and thermostatic "off" switch 76 comprises a hollow box type housing 94 into which a thermostatic and manual switch block 97 is mounted and through which spring loaded manually operated normally open "on" and "off" switches 98 and 99 respectively of the said switch block 97 are telescoped. The said switch block 97 is constructed of an insulating material and is mounted on the inside of the said housing 94 on inwardly protruding nibs 100 by screws 101 as best illustrated in Figs. 9 and 10. A movable bi-metal contact carrying thermostatic element 102 is mounted on a combined bracket and bus bar 103 which extends upwardly from the said switch block 97 and which is connected to one side of the said spring loaded manually operated normally open "on" and "off" switches 98 and 99 respectively as best shown in Figs. 6, 9 and 10. A movable contact 104 mounted on the thermostatic element 102 registers with and contacts a fixed contact 105 mounted on an adjustable arm 106 connected to a bus bar 104 having a terminal 108; the said bus bar 107 serving as one side of the normally open "on" switch 98. A bus bar 109 having a terminal 110 serves as one side of the normally open "off" switch 99. The said bus bar 103 has a terminal 111 by means of which electrical connection is made to the movable contact 104 of the thermostatic element 102.

By reference to Figs. 1, 3, 5, 6, 9 and 10, it is obvious that the momentary pressing of the "on" switch 98 of the combined manual "on" and "off" and thermostatic "off" switch 76 causes an electric impulse from the transformer 77 to pass through conductors 84, 112 and 113 to terminals A and D of the gas valve 20 whereupon the electro-magnets 56 thereof are energized which opens the gas port 25 and closes the electric switch 74 hereinbefore described in detail. The closing of the electric switch 74 of the gas valve 20 carries current to the terminal B thereof which lights the signal light bulb 83 through the conductors 85 and 87. The signal light 83 remains lighted the entire time the gas port 25 of the gas valve 20 remains open.

By the momentary pressing of the "off" switch 99 of the combined manual "on" and "off" and thermostatic "off" switch 76, an electric impulse from the transformer 77 passes through conductors 84, 112 and 114 to the terminals A and C of the gas valve 20 whereupon the electro-magnet 58 thereof is energized, the gas port 25 is closed and the electric switch 74 is opened, all as hereinbefore described in detail. The opening of the electric switch 74 shuts off current to the electric signal light bulb 83, which, when dark, shows that gas is not passing through the gas valve 20 to the gas water heater to which a gas line therefrom is connected.

When the bi-metallic thermostatic element 102 of the thermostatic "off" switch 115 of the combined manual "on" and "off" and thermostatic "off" switch 76 expands from heat radiated thereto from the hot water in the hot water tank 89 heated from gas passing through the gas valve 20 after the "on" switch 79 or the "on" switch 98 has been pressed and the gas port 25 of the said gas valve 20 opened, it brings its movable contact 104 into contact with the fixed contact 105 of the thermostatic "off" switch 115 which causes electric current from the transformer 77 to pass through the conductors 84, 112 and 114 to the terminals A and C of the gas valve 20 whereupon the electro-magnet 58 thereof is energized, the gas port 25 is closed and the electric switch 74 is opened, all as hereinbefore described in detail. The opening of the electric switch 74 shuts off current to the electric signal light bulb 83, which, when dark, shows that gas is not passing through the gas valve 20 to the water heater to which a gas line therefrom is connected.

When the hot water from a gas hot water heater, not shown, receiving gas through the gas valve 20 enters the hot water tank 89 through the water inlet 90 thereto, the hot water rises to the top of the tank, and, as soon as water in the said tank 89 is heated to the temperature to which the thermostatic "off" switch 115 is adjusted, it causes the said thermostatic "Off" switch 115 to close which shuts off gas to the hot water heater at the gas valve 20 as hereinbefore described. By sliding the combined manual "on" and "off" and thermostatic "off" switch 76 up or down on the hot water tank 89, the amount of water heated in any one turning-on of the gas to the hot water heater by momentarily pressing either the "on" switch 79 of the combined manual "on" and "off" switch and pilot light unit 75 or the "on" switch 98 of the combined manual "on" and "off" and thermostatic "off" switch 76 may be governed.

After the predetermined amount of water is heated and stored in the hot water storage tank 89, the thermostatic switch 115 shuts off the gas under the hot water heater as hereinbefore described. Except by manually holding either the "on" switch 79 or the "on" switch 98 closed by continually pressing the buttons thereof, the gas cannot again be turned on by momentarily pressing the "on" switch 79 or the "on" switch 98 until the water in the hot water storage tank 89 has become sufficiently cooled or is used sufficiently to permit the bi-metal thermostatic element 102 of the thermostatic "off" switch 115 to move its contact 104 away from the fixed contact 105 thereof. However, after the gas under the water heater has been turned on by momentarily pressing either the manual "on" switch 79 or the manual "on" switch 98 which opens the gas valve 20, the gas may be shut off at any time prior to the operation of the thermostatic "off" switch 115 by momentarily pressing either the manual "off" switch 80 or the manual "off" switch 99.

Although but one embodiment of the invention and one illustrative installation thereof has been disclosed and described in detail, it is obvious that many changes may be made in the size, shape arrangement and detail of the various parts of the invention without departing from the spirit thereof as defined by the appended claims.

I claim:

1. In a gas valve of the type enclosed in a hermetically sealed housing having a baffle therein dividing the housing into an inlet chamber and an outlet chamber and a gas port through said baffle formed to serve as a valve seat, an electromagnetic gravity valve composed of a gravity ball valve member normally closing said gas port, a pair of vertically spaced guides within said housing disposed above and parallel to said baffle, the said guides having valve operating plunger apertures therethrough in axial alignment with said gas port, an operating plunger reciprocatingly telescoped through said guides and linked to the top of said ball valve member, a guide pin depending from said ball valve member extending through said gas port maintaining said ball valve member in alignment between said operating plunger and said gas port when off its seat, a pair of electro-magnets depending from the upper guide member one on each side of said operating plunger, an armature fixed to said operating plunger extending transversely therefrom below said pair of electromagnets and attracted thereto when said pair of electro-magnets are energized momentarily whereby to lift said ball valve member off said valve seat, a downwardly facing transversely disposed shoulder formed on said operating plunger, a vertically disposed spring loaded detent pivotally mounted to engage the said valve operating plunger at said shoulder and hold said valve member off its seat upon momentarily energizing said pair of magnets, a transversely disposed electro-magnet positioned to withdraw said detent from supporting said gas valve operating plunger when energized momentarily whereby to permit said valve member to gravitate and close said gas port, the entire organization characterized by its quick action responsive to alternate momentary energization of the vertically disposed pair of electro-magnets and the single horizontally disposed electro-magnet.

2. In a gas valve of the type enclosed in a hermetically sealed housing having a baffle therein dividing the housing into an inlet chamber and an outlet chamber and a gas port through said baffle formed to serve as a valve seat, an electromagnetic gravity valve composed of a gravity ball valve member normally closing said gas port, a valve operating mechanism support including a pair of vertically spaced guides within said housing disposed above and with said guides parallel to said baffle, means for securing said operating mechanism support to said housing in suitable vertical adjustment with respect to said baffle to admit of said ball valve member seating in said valve seat, the said guides having valve operating plunger apertures therethrough in axial alignment with said gas port, an operating plunger reciprocatingly telescoped through said guides and linked to the top of said ball valve member, a guide pin depending from said ball valve member extending through said gas port maintaining said ball valve member in alignment between said operating plunger and said gas port when off its seat, a pair of electromagnets depending from the upper guide member one on each side of said operating plunger, an armature fixed to said operating plunger extending transversely therefrom below said pair of electro-magnets and attracted thereto when said pair of electro-magnets are energized momentarily whereby to lift said ball valve member off said valve seat, a downwardly facing transversely disposed shoulder formed on said operating plunger, a vertically disposed spring loaded detent pivotally mounted on said valve operating mechanism support to engage the said valve operating plunger at said shoulder and hold said valve member off its seat upon momentarily energizing said pair of magnets, a transversely disposed electro-magnet fixed to said valve operating mechanism support positioned to withdraw said detent from supporting said gas valve operating plunger when energized momentarily whereby to permit said valve member to gravitate and close said gas port, the entire organization characterized by its quick action responsive to alternate momentary energization of the vertically disposed pair of electro-magnets and the single horizontally disposed electro-magnets.

3. In a gas valve of the type enclosed in a hermetically sealed housing having a baffle therein dividing the housing into an inlet chamber and an outlet chamber and a gas port through said baffle formed to serve as a valve seat, an electro-magnetic gravity valve composed of a gravity ball valve member normally closing said gas port, a pair of vertically spaced guides within said housing disposed above and parallel to said baffle, the said guides having valve operating plunger apertures therethrough in axial alignment with said gas port, an operating plunger reciprocatingly telescoped through said guides and linked to the top of said ball valve member, a guide pin depending from said ball valve member extending through said gas port maintaining said ball valve member in alignment between said operating plunger and said gas port when off its seat, a pair of electro-magnets depending from the upper guide member one on each side of said operating plunger, an armature fixed to said operating plunger extending transversely therefrom below said pair of electro-magnets and attracted thereto when said pair of electro-magnets are energized momentarily whereby to lift said ball valve member off said valve seat, a downwardly facing transversely disposed shoulder formed on said operating plunger, a vertically disposed spring loaded detent pivotally mounted to engage the said valve operating plunger at said shoulder and hold said valve member off its seat upon momentarily energizing said pair of magnets, a transversely disposed electro-magnet positioned to withdraw said detent from supporting said gas valve operating plunger when energized momentarily whereby to permit said valve member to gravitate and close said gas port, non-magnetic spring means at the lower end of each magnet of the pair of depending electro-magnets of sufficient strength to cause the armature to break from said electro-magnets upon de-energization thereof, the entire organization characterized by its quick action responsive to alternate momentary energization of the vertically disposed pair of electro-magnets and the single horizontally disposed electro-magnet.

GEORGE T. KOPP.